Nov. 24, 1942.  J. H. BOICEY  2,302,740
MULTIPLE GLAZING UNIT
Filed Jan. 27, 1942
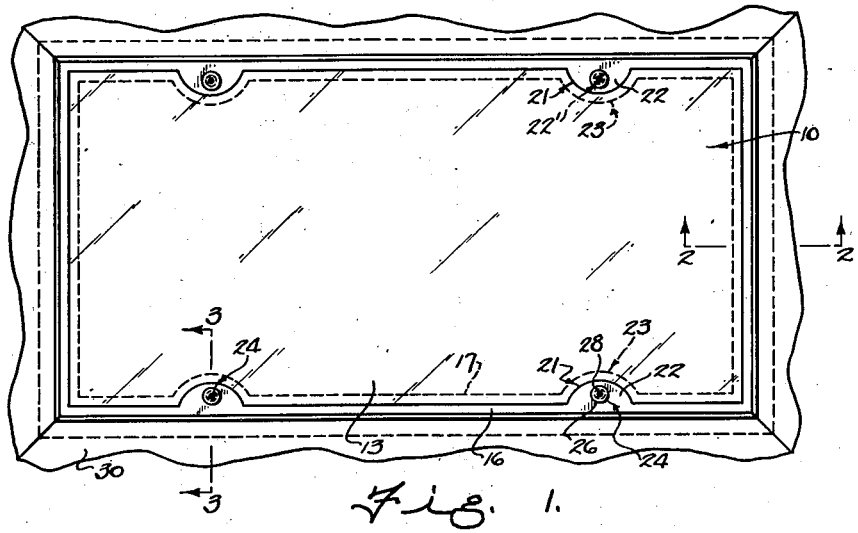
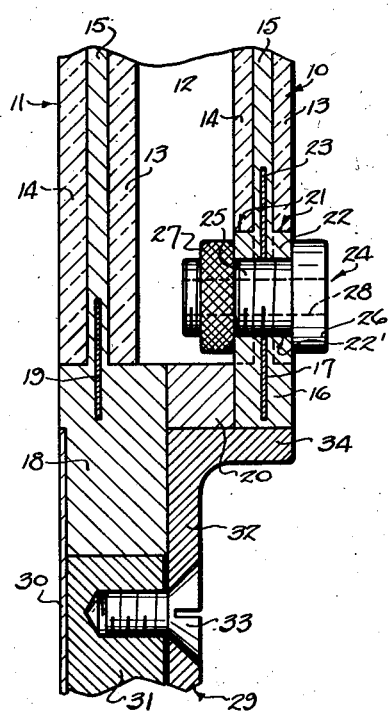
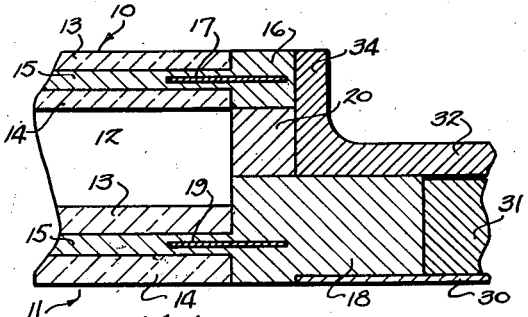
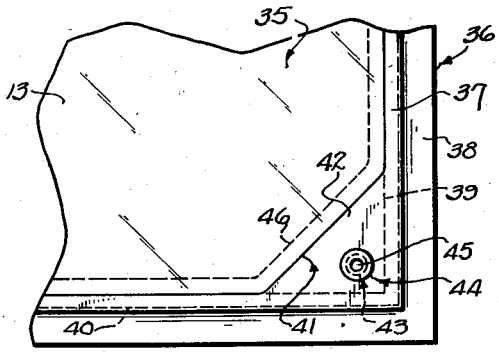
Fig. 1.
Fig. 2.
Fig. 3.
Fig. 4.
Inventor
JAMES H. BOICEY.
By Frank Fraser
Attorney Patented Nov. 24, 1942

2,302,740

UNITED STATES PATENT OFFICE 2,302,740

MULTIPLE GLAZING UNIT

James H. Boicey, Toledo, Ohio, assignor to Libby-Owens-Ford Glass Company, Toledo, Ohio, a corporation of Ohio Application January 27, 1942, Serial No. 428,383

14 Claims. (Cl. 20—56.5)

The present invention relates to improvements in multiple glazing units.

While the glazing units of this invention are not restricted to any particular use, they have been primarily designed for and are of especial utility in the glazing of windshield and/or window openings in airplanes and other aircraft.

Generally stated, the type of glazing unit comprehended by the invention comprises two transparent panels arranged in face to face relation and spaced from one another to provide an insulating space therebetween. The transparent panels are maintained in predetermined spaced relation by separator means arranged therebetween around the marginal portions thereof and secured thereto to provide a unit construction. Each transparent panel consists of a sheet of laminated safety glass comprising two sheets of glass and an interposed layer of thermoplastic adherent thereto. The plastic interlayer of each panel extends beyond the edges of the respective glass sheets and the said separator means is arranged between and secured to the extended portions of said plastic interlayers. There may also be carried by the plastic interlayer of each transparent panel, at each edge thereof, a strip of relatively thin, preferably flexible metal which projects outwardly beyond the edges of the respective glass sheets to provide a metal reinforcement for the extended plastic.

In the glazing of airplanes and other aircraft with multiple glazing units, it is desirable to vent the space between the transparent panels for the purpose of equalizing the air pressure inside and outside of the unit at different altitudes as well as to provide for conditioning of the air within the space between said panels to prevent condensation of moisture thereupon. Another advantage in venting the space between the transparent panels is that hot air may be circulated therethrough to prevent the accumulation of frost and ice upon the outer panel. To accomplish this, it has heretofore been customary to drill holes through the sheet of safety glass forming the inner transparent panel, including the two sheets of glass, and to secure a suitable type of fitting within each of said openings. This procedure of drilling the holes through the glass sheets was found very objectionable due to the tendency of the glass to spall or crack during drilling as well as the liability of cracking the glass sheets upon application of the fitting thereto.

It is the aim of this invention to so construct a multiple glazing unit of the above type whereby openings may be provided in the inner transparent panel for venting the interior of the unit without the necessity of drilling the glass sheets, so that the danger of cracking or spalling the glass is eliminated and also with the result that the venting fittings may be readily and conveniently secured to the said panel without danger of breaking the glass sheets.

Other objects and advantages of the invention will become more apparent during the course of the following description when taken in connection with the accompanying drawing.

In the drawing wherein like numerals are employed to designate like parts throughout the same:

Fig. 1 is a face view of a multiple glazing unit made in accordance with the invention;

Fig. 2 is a horizontal transverse section taken on line 2—2 of Fig. 1;

Fig. 3 is a vertical transverse section taken substantially on line 3—3 of Fig. 1; and Fig. 4 is a face view of one corner of a modified type of unit also embodying the invention.

With reference now to the drawing, and particularly to Figs. 1 to 3, the multiple glazing unit therein disclosed comprises generally the inner and outer transparent panels 10 and 11 equidistantly spaced from one another throughout their entire areas to provide an insulating space 12 therebetween. Each transparent panel 10 and 11 consists of a sheet of laminated safety glass including two sheets of glass 13 and 14 bonded to an interposed layer of thermoplastic 15. The glass sheets 13 and 14 may consist of ordinary plate or window glass and may be either fully tempered or semi-tempered, or any desired combination of glass sheets may be used. The plastic interlayer 15 may be formed of a polyvinyl acetal resin and one such resin which has been used is polyvinyl butyr acetal resin. This resin may be plasticized with from 15 to 30 parts dibutyl sebacate per 100 parts of resin by weight, depending upon the particular use to which the unit is to be put. However, different plastics varying in thickness and physical characteristics may be employed as the invention is not limited to the use of any particular resin, class of resins, cellulosic derivatives or the like.

It will be noted that the area of the glass sheets 13 and 14 of inner transparent panel 10 is relatively less than the area of the plastic interlayer 15, so that the plastic interlayer extends beyond the edges of the glass sheets to provide a flange 16 extending entirely around the edges of said panel. It is preferred that the extended flange 16 of plastic interlayer 15 be built up laterally so that it is of a thickness substantially equal to the thickness of the transparent panel as shown. The extended flange 16 of the plastic interlayer may be reinforced, if desired, by means of a strip of relatively thin, preferably flexible metal 17 provided along each edge of the transparent panel, said metal strip being of such a width that it extends inwardly of the peripheral edges of the glass sheets. The metal strips 17 may be of steel, tin, aluminum, galvanized metal, or the like, and the thickness thereof may be varied. By way of example, however, it may be mentioned that when using aluminum, a thickness of approximately .020 to .030 of an inch is satisfactory. An individual metal strip may be arranged at each edge of the transparent panel and the strips left disconnected at their adjacent ends or the adjacent ends thereof may be welded, soldered, or otherwise suitably secured together to form an integral collar. Also, a single one-piece frame may be cut from a sheet of the desired metal.

It will be noted that the plastic interlayer 15 of outer transparent panel 11 also extends beyond the edges of the glass sheets 13 and 14, as indicated at 18, and the extended portion of the plastic interlayer is built up to provide a frame of substantial thickness extending around the edges of the unit. The extended plastic frame 18 of outer transparent panel 11 may also be reinforced, if desired, by means of the metal strips 19 embedded in said frame and projecting inwardly of the edges of the glass sheets.

The two transparent panels 10 and 11 can be formed according to any preferred method of manufacturing laminated safety glass, after which they are arranged in spaced face to face relation and the extended portions 16 and 18 of the plastic interlayers 15 of said panels secured together by plastic spacer strips 20 of the desired width and thickness associated with one another to form a collar or frame extending entirely around the edges of the transparent panels. While individual spacer strips 20 may be used and simply butted against one another at their adjacent ends, the adjacent ends of said strips may be overlapped or other types of connections may be provided between the adjacent ends of the said strips. Also, a one-piece plastic collar or frame may be employed if desired.

After the plastic separator strips 20 have been properly located between the extended portions 16 and 18 of the plastic interlayers 15, the assembly can be subjected to heat and pressure to effect the bonding of the plastic separator means to the extended plastic of the transparent panels to form an integral unit. The separator strips 20 may also be formed from a polyvinyl acetal resin such as, for example, a polyvinyl butyr acetal resin plasticized with 7 parts dibutyl sebacate per 100 parts of resin by weight. However, it is of course not essential that the same type of plastic be used for the separator means as is used for the plastic interlayers 15 of the transparent panels. Also, if the plastic used is such as to require employment of adhesives, the proper adhesive is applied at the time assembly of the units is made.

As pointed out above, it is desirable in multiple glazing units to vent the space between the transparent panels to permit the equalization of air pressure inside and outside the unit at different altitudes as well as to provide for conditioning of the air within the space between said panels. Also, that in the past this has been done by drilling holes through the inner transparent panel including the two sheets of glass, but that such a procedure has been objectionable for a number of reasons.

In accordance with the present invention, the venting of the interior of the unit herein disclosed is accomplished without the necessity of drilling holes in the glass sheets, thereby eliminating the liability of spalling or cracking the glass incident to such drilling as well as the liability of cracking the glass sheets upon application of the venting fitting to the panel. To this end, the edges of the glass sheets 13 and 14 of inner transparent panel 10 are cut back at one or more points to provide notches 21 which extend into the body of the glass sheets and thereby expose a relatively small area 22 of the plastic interlayer 15. The exposed area 22 of the plastic interlayer is disposed inwardly of the separator means 20 and is also preferably built up to substantially the same thickness as the transparent panel as shown in Fig. 3. A vent opening 22' is then formed through the exposed area 22 of the plastic interlayer, and secured within said opening is a suitable type fitting 24 having an opening therethrough communicating with the chamber or space 12 between the transparent panels 10 and 11.

Although different types of fittings 24 may be used and secured to the transparent panel 10 in various ways, the particular fitting herein shown by way of example comprises a bolt 25 inserted through the vent opening 22' and having a head 26 at its outer end and a nut 27 threaded upon its inner end to clamp the fitting to the panel. The bolt 25 is provided with an axial opening 28 through which air may be introduced into the space between the panels or withdrawn therefrom as desired. The fitting 24 can be formed either of metal or a suitable plastic material and is adapted to be connected to any suitable means (not shown) for permitting or effecting the withdrawal of air from or the circulation of dehydrated or heated air through the space between the transparent panels, depending upon atmospheric conditions, air pressures, etc.

In fabricating the glazing unit, the vent openings 22' are of course formed through the plastic 22 and the fittings 24 installed before the transparent panels 10 and 11 are joined with the separator strips 20 in the manner above described. It is also preferred that the metal reinforcing strips 17 of inner panel 10 be provided with enlarged portions which follow the contour of the notches 21 and project inwardly thereof as indicated at 23. With such an arrangement, the vent openings 22' will also pass through the enlarged portions 23 of metal strips 17.

When mounting the glazing unit, it is secured within the opening to be glazed by clamping the extended portion 18 only of the plastic interlayer 15 of outer transparent panel 11 within a suitable frame 29. This frame may constitute a part of any window or windshield construction but will be herein referred to as forming part of an airplane. The skin of the plane is designated by the numeral 30 and the frame 29 comprises a stationary member 31 carried by the skin of the ship and a removable member 32 secured to said stationary member by screws or the like 33. The extended plastic frame 18 of outer panel 11 is clamped between the skin 30 of the ship and the removable frame member 32 which may be provided with an angular flange 34 engaging the outer edges of the inner transparent panel 10 and separator strips 20. Since the extended plastic 18 only is clamped in the supporting frame 29, the glazing unit will be permitted a certain amount of floating movement to and fro in the opening due to the resiliency or yieldability of the plastic and metal strip 19. Because of this, the liability of breaking or shattering of the glass resulting from weaving and twisting of the ship proper when in flight will be minimized.

In Fig. 4 is illustrated a slightly modified type of double glazing unit comprising the inner and outer transparent panels 35 and 36 respectively. These panels also consist of sheets of laminated safety glass, with the plastic interlayers thereof extending beyond the edges of the glass sheets as indicated at 37 and 38. The extended portions 37 and 38 of the plastic interlayers are secured together by the separator means 39 in the manner above described. The extended plastic 37 of inner transparent panel 35 may also have embedded therein the metal reinforcing strips 40 which project inwardly of the edges of the glass sheets, and similar metal reinforcing strips may be carried by the plastic interlayer of outer panel 36.

As shown, the glass sheets 13 and 14 of inner transparent panel 35 may be cut diagonally at one or more corners of the panel, as indicated at 41, to expose a relatively small area 42 of the plastic interlayer inwardly of the separator means 39. Formed through the exposed area of plastic 42 is a vent opening 43 in which is secured the fitting 44 having an opening 45 therethrough communicating with the space between the transparent panels. If desired, the metal reinforcing strip 40 can also project inwardly of the diagonal edges 41 of the glass sheets as indicated at 46, so that the vent opening 43 will also pass through the said metal strip.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. A multiple glass sheet glazing unit, comprising two transparent panels arranged in spaced face to face relation, each panel consisting of a sheet of laminated safety glass including two sheets of glass and an interposed layer of thermoplastic adherent thereto, the plastic interlayers of said panels extending beyond the edges of the glass sheets, separator means arranged between the transparent panels around the marginal portions thereof and secured to the extended portions of the plastic interlayers, the glass sheets of the inner panel being cut back from the edges thereof to expose an area of plastic inwardly of said separator means, and a vent opening formed through said exposed area of plastic and communicating with the space between the transparent panels.

2. A multiple glass sheet glazing unit, comprising two transparent panels arranged in spaced face to face relation, each panel consisting of a sheet of laminated safety glass including two sheets of glass and an interposed layer of thermoplastic adherent thereto, the plastic interlayers of said panels extending beyond the edges of the glass sheets, separator means arranged between the transparent panels around the marginal portions thereof and secured to the extended portions of the plastic interlayers, the glass sheets of the inner panel being cut back from the edges thereof to expose an area of plastic inwardly of said separator means, and a fitting carried by said exposed area of plastic and having an opening communicating with the space between the transparent panels.

3. A multiple glass sheet glazing unit, comprising two transparent panels arranged in spaced face to face relation, each panel consisting of a sheet of laminated safety glass including two sheets of glass and an interposed layer of thermoplastic adherent thereto, the plastic interlayers of said panels extending beyond the edges of the glass sheets, separator means arranged between the transparent panels around the marginal portions thereof and secured to the extended portions of the plastic interlayers, the glass sheets of the inner panel being cut back from the edges thereof to expose an area of plastic inwardly of said separator means, a vent opening formed through said exposed area of plastic, and a fitting inserted through said opening and also having an opening communicating with the space between the transparent panels.

4. A multiple glass sheet glazing unit, comprising two transparent panels arranged in spaced face to face relation, each panel consisting of a sheet of laminated safety glass including two sheets of glass and an interposed layer of thermoplastic adherent thereto, the plastic interlayers of said panels extending beyond the edges of the glass sheets, separator means arranged between the transparent panels around the marginal portions thereof and secured to the extended portions of the plastic interlayers, the glass sheets of the inner panel being cut back from the edges thereof to expose an area of plastic inwardly of said separator means, a metal reinforcing member carried by the exposed area of plastic and projecting inwardly between the glass sheets, and a vent opening formed through the exposed area of plastic and metal reinforcing member and communicating with the space between the transparent panels.

5. A multiple glass sheet glazing unit, comprising two transparent panels arranged in spaced face to face relation, each panel consisting of a sheet of laminated safety glass including two sheets of glass and an interposed layer of thermoplastic adherent thereto, the plastic interlayers of said panels extending beyond the edges of the glass sheets, separator means arranged between the transparent panels around the marginal portions thereof and secured to the extended portions of the plastic interlayers, the glass sheets of the inner panel being cut back from the edges thereof to expose an area of plastic inwardly of said separator means, a metal reinforcing member carried by the exposed area of plastic and projecting inwardly between the glass sheets, and a fitting carried by said exposed area of plastic and having a portion thereof extending therethrough and also through the metal reinforcing member and communicating with the space between the transparent panels.

6. A multiple glass sheet glazing unit, comprising two transparent panels arranged in spaced face to face relation, each panel consisting of a sheet of laminated safety glass including two sheets of glass and an interposed layer of thermoplastic adherent thereto, the plastic interlayers of said panels extending beyond the edges of the glass sheets, separator means arranged between the transparent panels around the marginal portions thereof and secured to the extended portions of the plastic interlayers, the glass sheets of the inner panel being cut back from the edges thereof to expose an area of plastic inwardly of said separator means, a metal reinforcing member carried by the exposed area of plastic and projecting inwardly between the glass sheets, a vent opening formed through the exposed area of plastic and metal reinforcing member, and a fitting inserted through said opening and also having an opening communicating with the space between the transparent panels.

7. A multiple glass sheet glazing unit, comprising two transparent panels arranged in spaced face to face relation, each panel consisting of a sheet of laminated safety glass including two sheets of glass and an interposed layer of thermoplastic adherent thereto, the plastic interlayers of said panels extending beyond the edges of the glass sheets, separator means arranged between the transparent panels around the marginal portions thereof and secured to the extended portions of the plastic interlayers, the glass sheets of the inner panel being notched to expose an area of plastic inwardly of said separator means, and a vent opening formed through said exposed area of plastic and communicating with the space between the transparent panels.

8. A multiple glass sheet glazing unit, comprising two transparent panels arranged in spaced face to face relation, each panel consisting of a sheet of laminated safety glass including two sheets of glass and an interposed layer of thermoplastic adherent thereto, the plastic interlayers of said panels extending beyond the edges of the glass sheets, separator means arranged between the transparent panels around the marginal portions thereof and secured to the extended portions of the plastic interlayers, the glass sheets of the inner panel being notched to expose an area of plastic inwardly of said separator means, and a fitting carried by said exposed area of plastic and having an opening communicating with the space between the transparent panels.

9. A multiple glass sheet glazing unit, comprising two transparent panels arranged in spaced face to face relation, each panel consisting of a sheet of laminated safety glass including two sheets of glass and an interposed layer of thermoplastic adherent thereto, the plastic interlayers of said panels extending beyond the edges of the glass sheets, separator means arranged between the transparent panels around the marginal portions thereof and secured to the extended portions of the plastic interlayers, the glass sheets of the inner panel being notched to expose an area of plastic inwardly of said separator means, a metal reinforcing member carried by the exposed area of plastic and projecting inwardly between the glass sheets, a vent opening formed through the exposed area of plastic and metal reinforcing member, and a fitting secured within said opening and also having an opening communicating with the space between the transparent panels.

10. A multiple glass sheet glazing unit, comprising two transparent panels arranged in spaced face to face relation, each panel consisting of a sheet of laminated safety glass including two sheets of glass and an interposed layer of thermoplastic adherent thereto, the plastic interlayers of said panels extending beyond the edges of the glass sheets, separator means arranged between the transparent panels around the marginal portions thereof and secured to the extended portions of the plastic interlayers, the glass sheets of the inner panel being cut diagonally at one corner thereof to expose an area of the plastic interlayer inwardly of said separator means, and a vent opening formed through said exposed area of plastic and communicating with the space between the transparent panels.

11. A multiple glass sheet glazing unit, comprising two transparent panels arranged in spaced face to face relation, each panel consisting of a sheet of laminated safety glass including two sheets of glass and an interposed layer of thermoplastic adherent thereto, the plastic interlayers of said panels extending beyond the edges of the glass sheets, separator means arranged between the transparent panels around the marginal portions thereof and secured to the extended portions of the plastic interlayers, the glass sheets of the inner panel being cut diagonally at one corner thereof to expose an area of the plastic interlayer inwardly of said separator means, and a fitting carried by said exposed area of plastic and having an opening communicating with the space between the transparent panels.

12. A multiple glass sheet glazing unit, comprising two transparent panels arranged in spaced face to face relation, each panel consisting of a sheet of laminated safety glass including two sheets of glass and an interposed layer of thermoplastic adherent thereto, the plastic interlayers of said panels extending beyond the edges of the glass sheets, separator means arranged between the transparent panels around the marginal portions thereof and secured to the extended portions of the plastic interlayers, the glass sheets of the inner panel being cut diagonally at one corner thereof to expose an area of the plastic interlayer inwardly of said separator means, a metal reinforcing member carried by the exposed area of plastic and projecting inwardly between the glass sheets, a vent opening formed through the exposed area of plastic and metal reinforcing member, and a fitting secured within said opening and also having an opening communicating with the space between the transparent panels.

13. A multiple glazing unit, including two transparent panels arranged in spaced face to face relation, one of said panels comprising a sheet of laminated safety glass including two sheets of glass and an interposed layer of thermoplastic adherent thereto, separator means arranged between the transparent panels around the marginal portions thereof and secured thereto, the glass sheets of said laminated panel being cut back from the edges thereof to expose an area of plastic inwardly of said separator means, and a vent opening formed through said exposed area of plastic and communicating with the space between the transparent panels.

14. A multiple glazing unit, including two transparent panels arranged in spaced face to face relation, one of said panels comprising a sheet of laminated safety glass including two sheets of glass and an interposed layer of thermoplastic adherent thereto, separator means arranged between the transparent panels around the marginal portions thereof and secured thereto, the glass sheets of said laminated panel being cut back from the edges thereof to expose an area of plastic inwardly of said separator means, and a fitting carried by said exposed area of plastic and having an opening communicating with the space between the transparent panels.

JAMES H. BOICEY.